United States Patent [19]

Norton

[11] Patent Number: 5,166,538

[45] Date of Patent: * Nov. 24, 1992

[54] DUAL OR SINGLE VOLTAGE VEHICULAR POWER SUPPLY WITH IMPROVED SWITCH DRIVER AND LOAD DUMP

[76] Inventor: Peter Norton, 1 S. Lakeside, Lake Hopatcong, N.J. 07849

[ * ] Notice: The portion of the term of this patent subsequent to Feb. 12, 2008 has been disclaimed.

[21] Appl. No.: 585,582

[22] Filed: Sep. 19, 1990

Related U.S. Application Data

[63] Continuation of Ser. No. 358,034, May 26, 1989, Pat. No. 4,992,672, which is a continuation-in-part of Ser. No. 204,343, Jun. 9, 1988, abandoned, which is a continuation-in-part of Ser. No. 941,332, Dec. 15, 1986, abandoned.

[51] Int. Cl.[5] .............................................. H02P 9/30
[52] U.S. Cl. .................................... 307/10.1; 307/9.1; 322/28; 322/90
[58] Field of Search ...................... 307/9.1, 10.1, 10.8, 307/40, 43, 75, 87; 322/40, 90, 28, 59; 320/15, 17, 39, 61; 363/160, 161, 164, 165

[56] References Cited

U.S. PATENT DOCUMENTS

| | | | |
|---|---|---|---|
| 4,347,473 | 8/1982 | Stroud | 322/90 X |
| 4,488,105 | 12/1984 | Papazian | 322/28 X |
| 4,491,779 | 1/1985 | Campbell et al. | 322/90 X |
| 4,516,066 | 5/1985 | Nowakowski | 320/17 X |
| 4,604,528 | 8/1986 | Norton | 322/28 |
| 4,634,954 | 1/1987 | Kato et al. | 322/28 |
| 4,636,705 | 1/1987 | Bowman | 322/28 |
| 4,636,706 | 1/1987 | Bowman et al. | 322/28 |
| 4,672,297 | 6/1987 | Gotoh et al. | 322/28 |
| 4,686,442 | 8/1987 | Radomski | 320/17 |
| 4,694,238 | 9/1987 | Norton | 322/28 |
| 4,723,105 | 2/1988 | Matouka et al. | 320/17 |
| 4,831,322 | 5/1989 | Mashino et al. | 322/28 |
| 4,992,672 | 2/1991 | Norton | 307/10.1 |

Primary Examiner—Paul Ip
Attorney, Agent, or Firm—Reising, Ethington, Barnard, Perry & Milton

[57] ABSTRACT

A dual voltage power supply is disclosed for vehicles equipped with a DC generator, a single storage battery, a low voltage load circuit including the storage battery, and a high voltage load circuit including load devices designed to be powered by voltages higher than the battery voltage. At times when higher voltage power is required a low voltage regulator that includes a high current semiconductor switch converts power at the generator output voltage to power at a lower voltage for charging the battery and supplying the low voltage load circuit. There is a single voltage mode of operation when higher voltage power is not required in which the alternator is regulated to supply power at the voltage required by the low voltage load circuit and the high current semiconductor switch is held in its closed state to directly connect the generator output with the low voltage load circuit. The low voltage regulator is a switching DC to DC voltage converter with an N channel mosfet power transistor switch controlled by an improved driver circuit. The driver circuit has a floating totem pole output and a capacitively coupled input and is assisted by a pull down circuit and current from a low current supply. An input accepts a signal controlling whether the system operates in dual or single voltage mode. One or more transient absorbing semiconductors and a circuit for rapidly decreasing rotor current limit the duration of alternator overvoltage.

17 Claims, 3 Drawing Sheets

5,166,538

DUAL OR SINGLE VOLTAGE VEHICULAR POWER SUPPLY WITH IMPROVED SWITCH DRIVER AND LOAD DUMP

This application is a continuation of Ser. No. 358,034, filed May 26, 1989, now U.S. Pat. No. 4,992,672 which is a continuation-in-part application of Ser. No. 204,343 filed Jun. 9, 1988 for "Dual Or Single Voltage Vehicular Power Supply With Improved Switch Driver And Load Dump", abandoned which is a continuation-in-part application of Ser. No. 941,332 filed Dec. 15, 1986 for "Dual Or Single Voltage Vehicular Power Supply With Improved Switch", now abandoned.

FIELD OF THE INVENTION

This invention relates to electrical systems for automotive vehicles; more particularly it relates to circuits for dual voltage vehicular electrical systems. It also relates to circuits for driving the gate electrodes of N-channel power mosfet transistors.

BACKGROUND OF THE INVENTION

The prior art relating to vehicular electrical systems is replete with dual voltage power supplies of various forms.

One system presently in production provides power at sixty volts to an electrically heated windshield. This is accomplished using a conventional alternator designed for a nominal twelve volt system. When windshield heating is required the alternator is disconnected from all of the nominally twelve volt systems and is connected with the windshield heating element. The alternator field is then energized to generate the required output voltage. For a period of time, all of the nominally twelve volt systems are energized from the vehicle battery while the alternator supplies power to the windshield. If the battery voltage drops below a predetermined level while the windshield is being heated a protective circuit disconnects the windshield from the alternator and restores alternator power to the other vehicle systems. The resistance of the windshield is monitored by a resistance bridge in which the windshield and a current sensing resistor connected in series comprise one side of the bridge.

This known system has the disadvantage of requiring a large mechanical relay which is a type of device that is well known to be less reliable than semiconductor switches. This known system also has the disadvantage of requiring the battery to supply the vehicle, which may require large amounts of power, at all times that the windshield is being heated. This requires a large and expensive battery which is still inadequate to meet some user demands. This known system also has the disadvantage of requiring a current sensing resistor capable of carrying large currents which is expensive and wasteful of energy.

U.S. Pat. No. 4,604,528 issued Aug. 5, 1986 to Peter Norton teaches a dual voltage system wherein the alternator operates at a higher voltage at all times and a DC to DC converter converts some of the higher voltage power to a lower voltage so all vehicle systems can be powered simultaneously.

My copending application Ser. No. 941,332 filed Dec. 15, 1986 for "Dual Or Single Voltage Vehicular Power Supply With Improved Switch" teaches a dual voltage regulator using P-channel mosfet transistors which can operate in both dual voltage and single voltage modes and which has a main gate drive circuit which drives the gate electrode of the main power switch through a capacitor. An augmenting circuit maintains the main power switch in its on or off state indefinitely which the main gate drive circuit could not do because the capacitor would eventually discharge. The disclosure of that patent application is incorporated herein by reference.

Circuits for driving mosfet power transistors are described in the literature. A review of such circuits is provided by chapter 6 of the second edition of POWER MOSFET TRANSISTOR DATA copyright 1986 and published by Motorola Inc. Known circuits suitable for driving an N-channel power mosfet transistor operating as a high side switch require substantial power at a voltage above the voltage of the high rail or cannot maintain the transistor in the on state indefinitely.

When a load device is disconnected from an alternator the output voltage of the alternator can rise rapidly, in the absence of protective equipment, to a voltage that may exceed one hundred volts. It is known to include transient absorbing semiconductors to limit the voltage rise. These devices must be much larger where the alternator operates at about six volts because much higher powers must be absorbed therefore resulting in higher cost.

Multilayer ceramic capacitors have recently become available in capacitances in the range of ten to one hundred microfarads which makes them suitable for storing energy in vehicular dual voltage electrical systems. These capacitors are relatively expensive thereby encouraging circuit designs that minimize the capacitance of the energy storage capacitor.

A general object of this invention is to provide a dual voltage electrical system for automotive vehicles which overcomes certain disadvantages of the prior art.

SUMMARY OF THE INVENTION

This invention provides a dual voltage power supply for vehicles which is adapted to supply one load circuit at a regulated voltage and to supply a second load circuit at a voltage higher than the regulated voltage. The invention is embodied in a vehicular electrical system which includes a generator, such as a conventional alternator, having a field winding of controlled energization. A first load circuit is connected across the battery and includes one or more load devices designed to be energized at the rated voltage of the battery. A second load circuit includes one or more load devices designed to be energized at a voltage substantially higher than the rated voltage of the battery. A first regulator is coupled between the output of the generator and the first load circuit and produces an output voltage meeting the requirements of the first load circuit. Further, a second regulator is responsive to the generator output voltage and is coupled with the field winding of the generator for controlling the generator to produce an output voltage meeting the requirements of the first load circuit at certain times and meeting the requirements of the second load circuit at other times. The generator output is coupled with the second load circuit and, at the aforementioned certain times, with the first load circuit. The first regulator comprises an N-channel mosfet power transistor switch or other suitable switching means and an inductor in circuit between the generator and the first load circuit and means for controlling the duty cycle of the switching means. The second regulator is adapted to regulate the generator output voltage at said higher voltage or at said lower voltage.

The driver circuit for driving the N-channel mosfet power transistor switch is an inverter supplied by a floating power source. The inverter input is driven through a capacitor and its output is directly connected with the gate electrode of the aforementioned N-channel mosfet power transistor switch and the low voltage terminal of the floating power source is connected with the source electrode of the aforementioned N-channel mosfet power transistor switch.

A capacitor and a diode comprise the floating power source and supply substantially all of the power required by the inverter from the 12 volt vehicle power supply.

In a first embodiment of the invention, a resistor pulls down the voltage at the inverter input at certain times and raises the voltage at certain other times thereby stabilizing the inverter output. In a second embodiment of the invention the aforementioned resistor is assisted by a transistor and a diode thereby more effectively pulling down the voltage at the inverter input at the aforementioned certain times.

In the aforementioned first embodiment of the invention the driver circuit for driving the N-channel mosfet power transistor switch includes a transistor and a resistor for stabilizing the inverter output at its low level at the aforementioned certain other times. In the aforementioned second embodiment of the invention the aforementioned transistor and resistor are assisted by a second transistor for more effectively stabilizing the inverter output at its low level. Further, a charge pump supplies current to the high voltage terminal of the floating power source thereby also stabilizing the inverter output.

Means responsive to a control signal closes the mosfet power transistor switch to connect the alternator output directly and constantly to the first load circuit when so directed by the control signal.

Voltage sensing means are provided to sense the alternator output voltage and, at times of excessive voltage, rapidly diminish the alternator field current while transient absorbers limit the alternator voltage to a safe value.

A SENSEFET transistor controls power to the heating element of the windshield and the SENSEFET transistor also functions as two of the resistance elements of a resistance sensing bridge for sensing the resistance of the windshield.

Combining the aforementioned functions in one package substantially reduces the number of components required and the overall cost of the system.

A more complete understanding of this invention may be obtained from the detailed description that follows taken with the accompanying drawings.

BEST MODE FOR CARRYING OUT THE INVENTION

Figure 1:
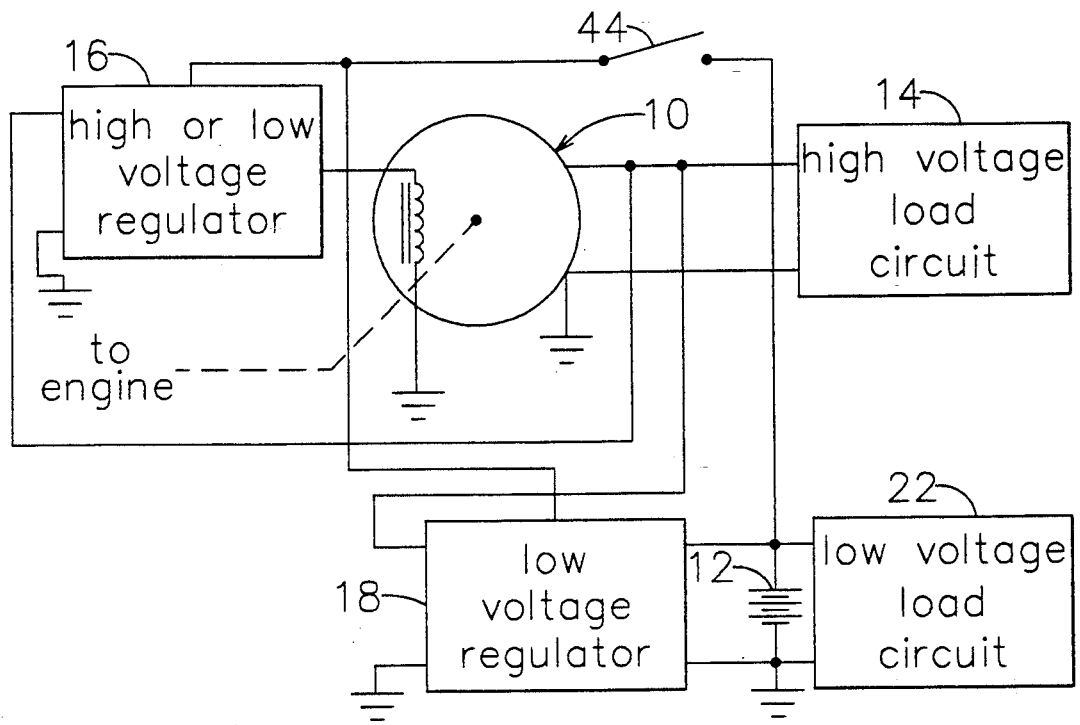
FIG. 1 is a block diagram of the dual voltage system of the invention.

Referring now to the drawings, there is shown an illustrative embodiment of the invention in a dual voltage power supply using the alternator and battery of a conventional automotive vehicle with a heated windshield. It will be appreciated as the description proceeds that the invention is useful in other applications and in different embodiments.

The dual voltage power supply of this invention is represented in block diagram in FIG. 1. The system comprises, in general, a generator 10 driven at variable speed by the vehicle engine, and a storage battery 12. The generator 10 supplies output voltage directly to the high voltage load circuit 14 and is controlled by a high or low voltage regulator 16. The generator output voltage is supplied through a low voltage regulator 18 to charge the battery 12 and to supply a low voltage load circuit 22. The high or low voltage regulator 16 and the low voltage regulator 18 are combined into a single unit in which many of the components are shared. The generator 10 is suitably a conventional automotive alternator which is capable of producing a DC output voltage ranging from less than twenty volts at engine idle speed to perhaps 100 volts at high speed of the engine: The high voltage load circuit 14 may include high power load devices such as a heater fan and high voltage load devices such as a window heater, such load devices being adapted to operate at voltages up to, say, 70 volts. The storage battery 12 is a conventional 12 volt automotive battery. The low voltage load circuit 22 includes the conventional automotive accessories which are rated for 12 volts such as the lamps, horn, and starter motor.

Figure 2:
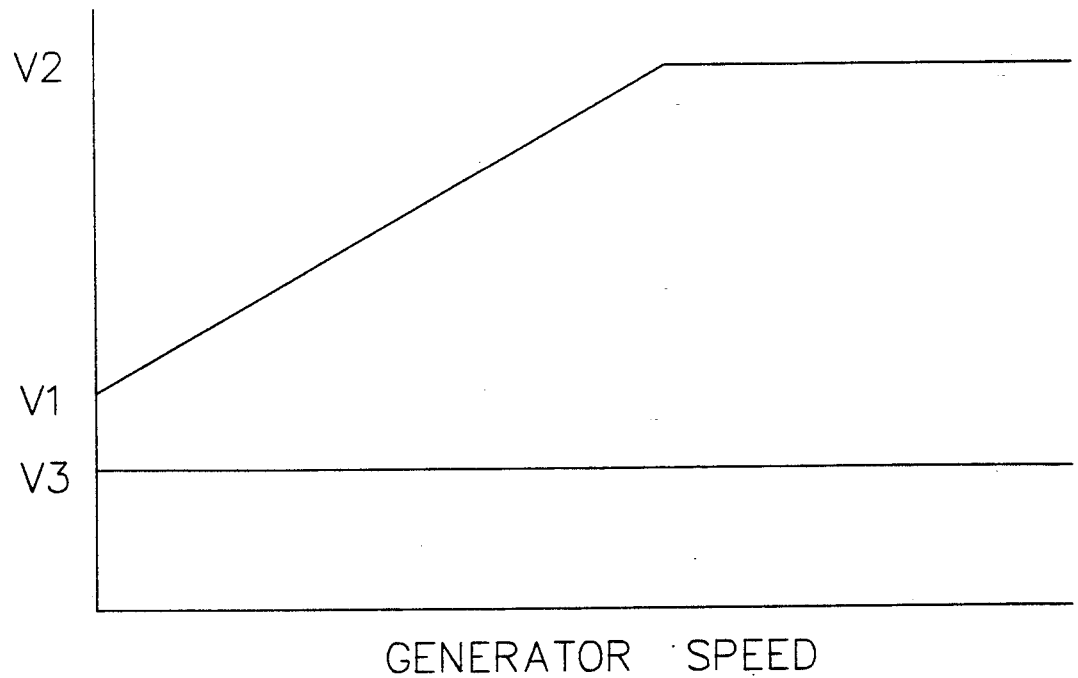
FIG. 2 is a graph showing the general relationship between the system output voltages and generator speed.

The dual voltage power supply of this invention is adapted to produce a substantially constant low voltage output for supplying the low voltage load circuit 22 as shown in FIG. 2. The low voltage output V3 is regulated to maintain the charge of the battery and is substantially independent of engine speed. At certain times when it is only required to supply the low voltage circuit because the high voltage devices do not require power the alternator is regulated to produce voltage V3 suitable for direct connection to low voltage load circuit 22 and at other times the alternator is regulated to produce a higher voltage output. When the high voltage devices require power the output of the generator or alternator 10 which is applied to the high voltage load circuit 14 may vary from a low voltage V1 at idle speed of the engine to a regulated value V2 which is achieved by the alternator only above a predetermined engine speed. The output of the alternator may be varied so as to maximize the efficiency of the system or to accomplish other purposes as described in copending application Ser. No. 844,512 filed Mar. 27, 1986 by Peter Norton which is incorporated herein by reference.

Figure 3:
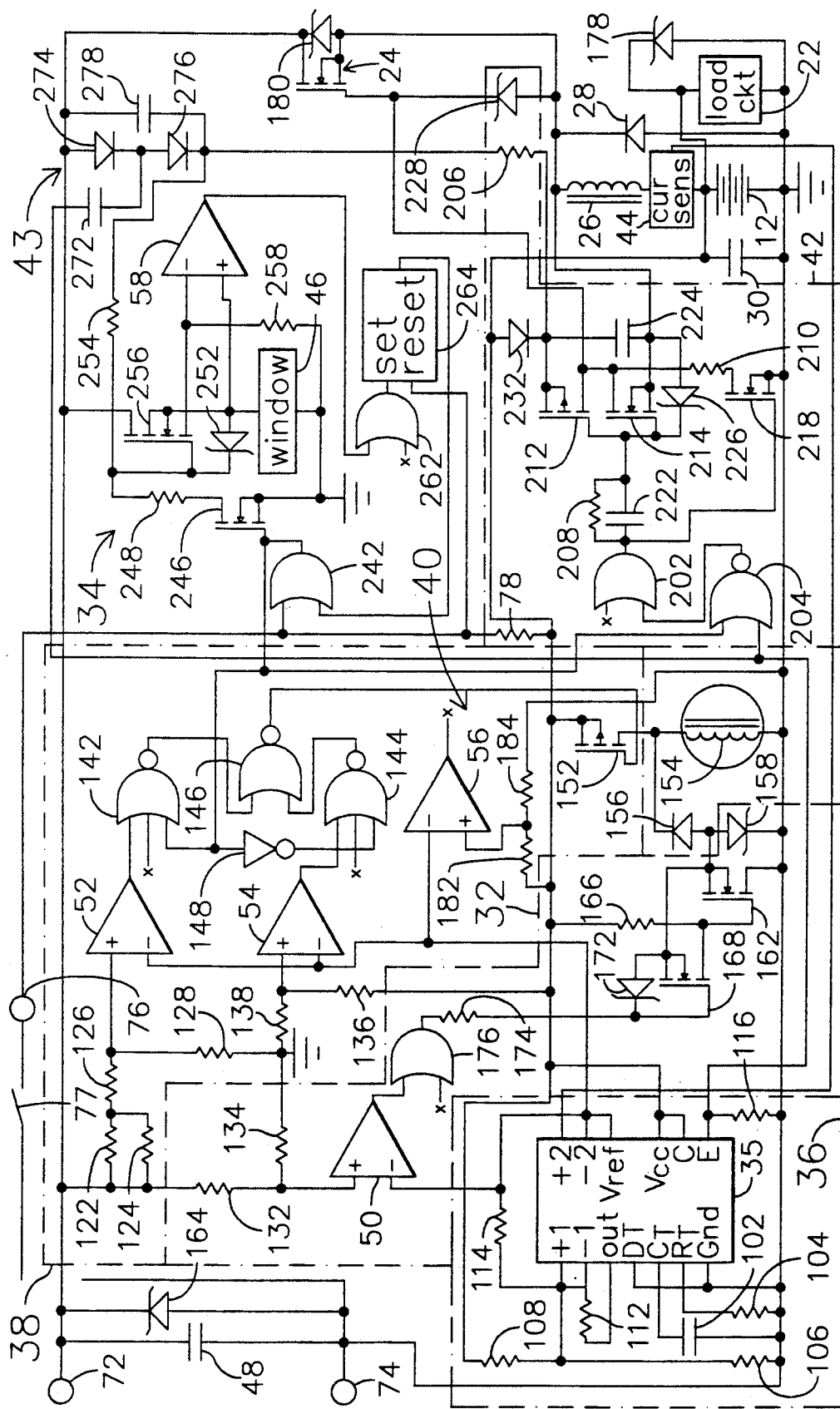
FIG. 3 is a schematic diagram of the regulator using an N channel mosfet switching transistor and including a window control circuit with resistance sensing and including an overvoltage management circuit.
Figure 4:
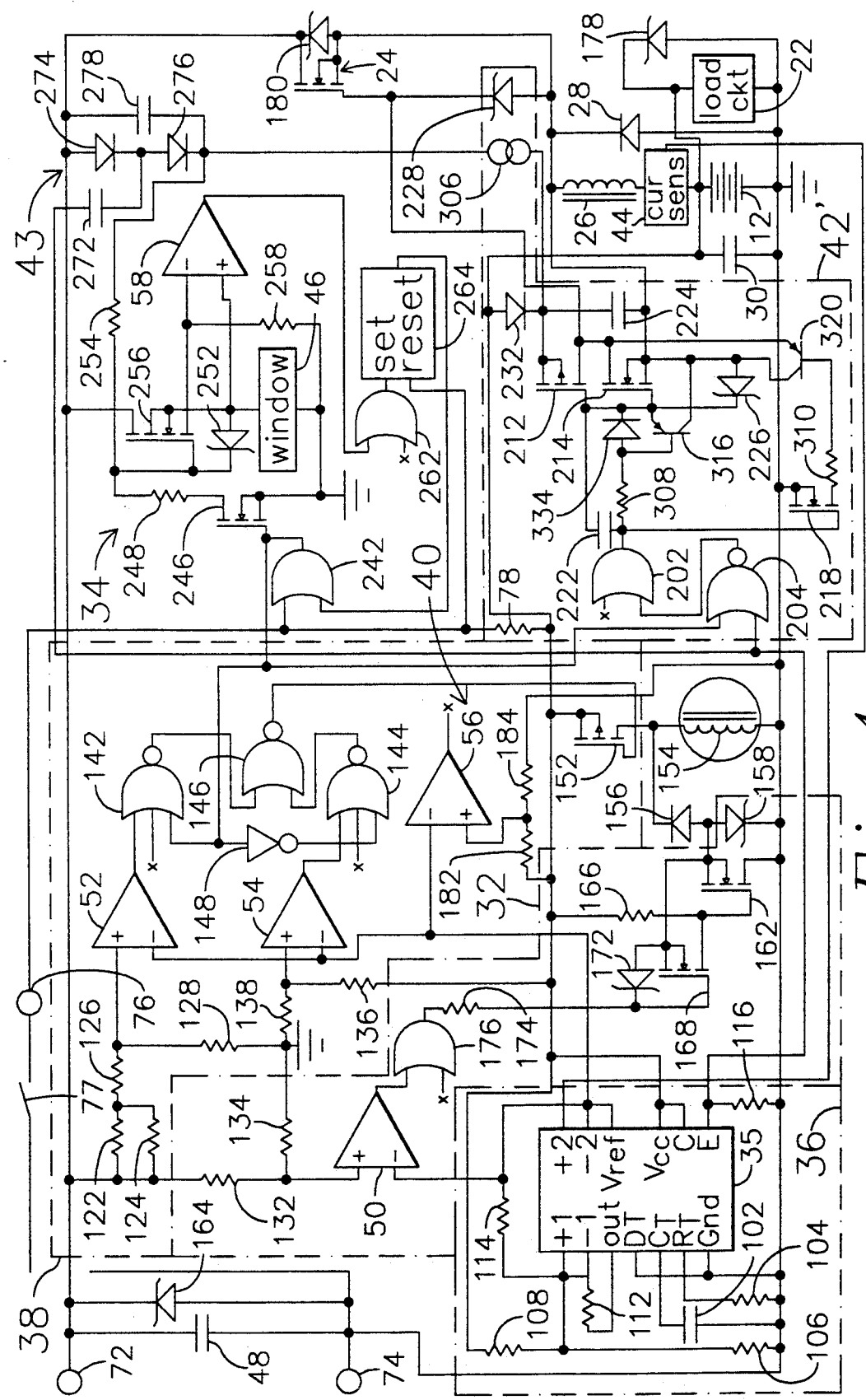
FIG. 4 is a schematic diagram of the regulator illustrating a different power stage driver circuit than the schematic diagram of FIG. 3.

FIGS. 3 and 4 illustrate dual voltage regulators for a vehicle having an electrically heated windshield. Each regulator utilizes one or more N-channel mosfet power transistors 24 as the main switching transistor. The high or low voltage regulator 16 and the low voltage regulator 18 of FIG. 1 are incorporated in the circuits of FIGS. 3 and 4. FIGS. 3 and 4 also incorporate the following subcircuits: alternator overvoltage management circuit 32, window heating element control and resistance sensing circuit 34, pulse width modulating circuit 36, alternator field control circuit 38, battery overvoltage management circuit 40, switch driving circuit 42 (FIG. 3) or switch driving circuit 42' (FIG. 4), and source 43 of direct current at a voltage greater than the alternator output voltage.

Five comparators; 50, 52, 54, 56, and 58 are provided. Comparator 50 determines if the alternator voltage is above a limiting voltage such that corrective action is required. Comparator 52 determines if the alternator output voltage is above the desired high voltage circuit voltage. Comparator 54 determines if the battery circuit voltage is above the desired voltage. Comparator 56 determines if the battery circuit voltage is excessive, i.e. it is above a predetermined limit such that rapid shutdown is required. Comparator 58 determines if the windshield heater resistance exceeds a predetermined limit. The inverting input of each of the comparators except 58 is connected with a source of reference voltage, for example 5 volts, provided by integrated circuit chip 35.

The pulse width modulating circuit 36 will now be described. It comprises a commercially available integrated circuit chip 35 known as the MC35060 available from Motorola Semiconductor Products, Phoenix, Ariz. Similar integrated circuits could be substituted by those skilled in the art. The integrated circuit chip 35 has two differential voltage sensing input circuits each with noninverting and inverting input connections giving four input points labeled respectively "+1", "−1", "+2", and "−2". The outputs of the voltage sensing circuits are combined and presented at the connection labeled "out". The output of integrated circuit chip 35 is a series of logic pulses of width that decreases to zero as the voltage of either of the noninverting inputs rises above the corresponding inverting input. The output is obtained from an uncommitted output transistor incorporated in the integrated circuit with open collector and emitter connected respectively with the connections labeled "C" and "E". The connection labeled "C" is connected with the battery voltage circuit as is the connection labeled "Vcc. The output series of logic pulses is obtained from the connection labeled "E". The integrated circuit chip 35 provides for varying the minimum dead time by controlling the input labeled "DT". This feature is disabled by connecting the input labeled "DT" to ground as is the connection labeled "Gnd". An internal oscillator of integrated circuit chip 35 controls the frequency of the series of logic pulses. The frequency of the internal oscillator is determined by a capacitor 102 and a resistor 104 connected respectively with the terminals labeled "$C_T$" and "$R_T$". A precise 5 volt reference voltage is output by integrated circuit chip 35 at the output labeled "$V_{ref}$".

The pulse width modulating circuit 36 also comprises the following circuit components. Resistors 106 and 108 form a voltage divider providing somewhat less than 5 volts at their junction when the voltage across low voltage load circuit 22 is at the desired value. Resistor 106 has a positive temperature coefficient to cause the voltage across low voltage load circuit 22 to be controlled to a somewhat higher voltage at lower temperatures. Other known means such as diodes and more complex resistor networks may be used to obtain temperature compensation. The voltage at the junction of resistors 106 and 108 is applied to the "+1" noninverting input of integrated circuit chip 35. The output of current sensor 44 is applied to the "+2" noninverting input of integrated circuit chip 35. Resistors 112 and 114 are series connected between the reference voltage and the output of the voltage sensing input circuits of integrated circuit chip 35 and the junction between them is connected with the "−1" input of integrated circuit chip 35. The response may be improved by replacing resistor 112 by any of the more complex circuits known to those skilled in the art such as by adding the series combination of a capacitor and resistor (not shown) in parallel with resistor 112. Resistor 116 is the load resistor of the internal uncommitted output transistor of integrated circuit chip 35 and is connected through the "E" terminal between the emitter of the internal uncommitted output transistor and ground. The reference voltage is connected with the "−2" inverting input of integrated circuit chip 35.

The alternator field control circuit 38 will now be described. Refer to the contents of "box" 38. The alternator field control circuit 38 comprises resistors 122, 124, 126, 128, 136, and 138; comparators 52 and 54; NOR circuits 142, 144, and 146; inverter 148; and switching transistor 152. Resistors 122, 124, 126, and 128 form a voltage divider between the alternator output terminal 72 and ground providing 5 volts at their junction when the voltage across the high voltage load circuit 14 is at the desired value. Resistor 124 has a negative temperature coefficient for reducing the voltage of the high voltage circuit at higher temperatures. The voltage at the junction of resistors 126 and 128 is applied to the noninverting input of comparator 52. Resistors 136 and 138 form a voltage divider providing 5 volts at their junction when the voltage across the low voltage load circuit 22 is at the desired value. The voltage at the junction of resistors 136 and 138 is applied to the noninverting input of comparator 54. Resistor 138 has a positive temperature coefficient to cause the voltage across low voltage load circuit 22 to be regulated to a somewhat higher voltage at lower temperatures. Other known means including diodes and more complex resistor networks may be used to obtain temperature compensation. The mode set input signal obtained from terminal 76 is a logic signal controlled by switch 77 that may be on the vehicle dashboard for control by the driver. The mode set signal is at logic high when the window heater is directed to be off and logic low to turn the window heater on. When switch 77 is open the mode set signal is raised to logic high by current through resistor 78. When switch 77 is closed it connects the mode set input with ground. The mode set signal is combined with the output of R-S latch 264 by OR circuit 242 to generate a mode signal that is low when the windshield is being heated. The outputs of comparators 52 and 54 are respectively connected with first inputs of NOR circuits 142 and 144. The output of comparator 56 is connected with second inputs of NOR circuits 142 and 144. The mode signal is connected with a third input of NOR circuit 142. The mode signal is inverted by inverter 148 and the inverted mode signal is connected with a third input of NOR circuit 144. The outputs of NOR circuits 142 and 144 are connected with the inputs of NOR circuit 146. The output of NOR circuit 146 is connected with the gate electrode of switching transistor 152. Switching transistor 152, which is preferably a P-channel mosfet switching transistor, is connected between the positive voltage side of the low voltage load circuit 22 and the parallel combination of the alternator rotor 154 and the circuit comprising freewheeling diode 156, transient absorber 158, and switching transistor 162.

The alternator overvoltage management circuit 32 will now be described. It comprises comparator 50, transient absorbers 158 and 164, switching transistors 162 and 168, resistors 132, 134, 166, and 174, zener diode 172, and OR circuit 176. Optionally, it also comprises transient absorbers 178 and 180.

Transient absorber 164 is connected across the alternator terminals 72 and 74. Resistors 132 and 134 form a voltage divider between the alternator terminal 72 and 74 providing 5 volts at their junction when the voltage across alternator terminals 72 and 74 has reached a level where corrective action is required to prevent damage. The voltage from the junction of resistors 132 and 134 is applied to the noninverting input of comparator 50. The inverting input of comparator 50 is connected with the 5 volt reference supplied by integrated circuit chip 35. The output of comparator 50 is connected with one input of OR circuit 176. The other input of OR circuit 176 is connected with the output of comparator 56. The output of OR circuit 176 is connected through resistor 174 with the gate electrode of switching transistor 168. Zener diode 172 is connected between the gate electrode and the source electrode of switching transistor 168 for protecting against excessive gate voltage. The gate electrode of switching transistor 162 is connected with the drain electrode of switching transistor 168 and is connected through resistor 166 with the positive side of the low voltage load circuit 22. The source electrode of switching transistor 162 is connected with the source electrode of switching transistor 168 and is also connected with the junction between the anode of diode 156 and the anode of transient absorber 158. The drain electrode of switching transistor 162 is connected with ground whereby switching transistor 162 is connected in parallel with transient absorber 158 and the parallel combination thereof is connected in series with freewheeling diode 156. If it is included, the transient absorber 180 is connected between the drain and source electrodes of the main switching transistor 24. Transient absorber 180 is preferably the internal body diode between the drain and the source electrodes of the main switching transistor 24. If it is included, the transient absorber 180 is connected across low voltage load circuit 22.

The switch driving circuit 42 will now be described. Refer to the contents of "box" 42 of FIG. 3. The main switching transistor 24 is driven under the direction of pulse width modulating circuit 36 and other logic by the switch driving circuit 42 comprising OR circuit 202; NOR circuit 204; resistors 206, 208 and 210; switching transistors 212, 214, and 218; capacitors 222 and 224; zener diodes 226 and 228; and diode 232. One input of NOR circuit 204 is connected with the "E" terminal of integrated circuit chip 35 and the other is connected with the mode signal from OR circuit 242. The output of NOR circuit 204 is connected with one input of OR circuit 202. The other input of OR circuit 202 is connected with the output of comparator 56. OR circuit 202 preferably has an output circuit capability similar to that of the DS0026 that has high current output capability. If an OR circuit with high current output capability cannot be obtained, an equivalent circuit would be to replace OR circuit 202 with a two input NOR circuit driving a DS0026 or equivalent integrated circuit. The output of OR circuit 202 is connected with the gate electrode of switching transistor 218 and one terminal of the parallel combination of resistor 208 and level shifting capacitor 222. The source electrode of switching transistor 218 is connected with ground and the drain electrode is connected through resistor 210 with the gate electrode of the main switching transistor 24. Switching transistors 212 and 214 are preferably P-channel and N-channel mosfet transistors respectively. The gate electrodes of switching transistors 212 and 214 are connected together and with the other terminal of the parallel combination of resistor 208 and level shifting capacitor 222 and to the cathode of zener diode 226. The source electrode of switching transistor 212 is connected with the cathode of diode 232 and one terminal of capacitor 224. It is also connected through resistor 206 with the source 43 of direct current at a voltage greater than the voltage at alternator terminal 72. The source electrode of switching transistor 214 is connected with the anode of zener diode 226, the other terminal of capacitor 224, and the source electrode of the main switching transistor 24 and related components which include the cathode of free wheeling diode 28, the anode of zener diode 228, and one terminal of inductor 26. The drain electrodes of switching transistors 212 and 214 are connected together and with one terminal of resistor 210, the gate electrode of the main switching transistor 24, and the cathode of zener diode 228. The anode of zener diode 228 is connected with the source electrode of main switching transistor 24 and the cathode is connected with the gate electrode of main switching transistor 24.

The switch driving circuit 42' will now be described. Refer to the contents of "box" 42' of FIG. 4. Many of its components are the same and perform the same function as in switch driving circuit 42 illustrated in FIG. 3 and these components retain the same identification numbers as in FIG. 3. Those components that are different or function differently are identified by a number beginning with the digit "3". The main switching transistor 24 is driven under the direction of pulse width modulating circuit 36 and other logic by the switch driving circuit 42' comprising OR circuit 202; NOR circuit 204; constant current source 306; resistors 308 and 310; transistors 212, 214, 316, 218 and 320; capacitors 222 and 224; zener diodes 226 and 228; and diodes 232 and 334. OR circuit 202 and NOR circuit 204 are preferably the same components and are provided the same input signals as described hereinabove with respect to the switch driving circuit 42 of FIG. 3. The output of OR circuit 202 is connected with the gate electrode of switching transistor 218, one terminal of resistor 308, and one terminal of level shifting capacitor 222. Switching transistor 218 is preferably an N-channel mosfet transistor. The source electrode of switching transistor 218 is connected with ground and the drain electrode is connected through resistor 310 with the base electrode of switching transistor 320. Switching transistor 320 is preferably a PNP bipolar transistor. The other terminal of resistor 308 is connected with the anode of diode 334 and to the base electrode of bipolar transistor 316. Transistor 316 is preferably a PNP bipolar transistor. The gate electrodes of switching transistors 212 and 214 are connected together and with the other terminal of level shifting capacitor 222, the emitter of bipolar transistor 316, and the cathodes of zener diode 226 and diode 334. Switching transistors 212 and 214 are preferably P-channel and N-channel mosfet transistors respectively. The source electrode of switching transistor 212 is connected with the cathode of diode 232 and one terminal of capacitor 224. It is also connected through constant current source 306 with the source 43 of direct current at a voltage greater than the voltage at alternator terminal 72. Constant current source 306 may be two transistors connected in a mirror configuration, a field-effect current regulator diode, or any other known means for maintaining an approximately constant current in the presence of voltage variations. The source electrode of switching transistor 214 is connected with the other terminal of capacitor 224, the collector of bipolar transistor 316, the anode of zener diode 226, the collector of bipolar transistor 320, and the source electrode of the main switching transistor 24 and related components which include the cathode of free wheeling diode 28, the anode of zener diode 228, and one terminal of inductor 26. The drain electrodes of switching transistors 212 and 214 are connected together and with the emitter of bipolar transistor 320, the gate electrode of the main switching transistor 24, and the cathode of zener diode 228. The anode of zener diode 228 is connected with the source electrode of main switching transistor 24 and the cathode is connected with the gate electrode of main switching transistor 24.

The battery overvoltage management circuit 40 will now be described. It comprises resistors 182 and 184 and comparator 56. In its operation it utilizes elements of the switch driving circuits 42 or 42' and the alternator overvoltage management circuit 32 that are described hereinabove. The battery overvoltage management circuit 40 is assisted by capacitor 30 and/or transient absorber 178. Capacitor 30 and/or transient absorber 178 provide protection during the time required for overvoltage management circuit 40 to activate. Resistors 182 and 184 form a voltage divider across the low voltage load circuit 22 such that the voltage at their junction reaches 5 volts when the voltage across the low voltage load circuit 22 becomes excessive. The junction between resistors 182 and 184 is connected with the noninverting input of comparator 56. The inverting input of comparator 56 is connected with the 5 volt reference supplied by integrated circuit chip 35. The output of comparator 56 is connected with the inputs denoted by "x" of NOR circuits 142 and 144 and OR circuits 176, 202 and 262.

The window heat control and resistance sensing circuit 34 will now be described. It comprises OR circuits 242 and 262, switching transistor 246, resistors 248, 254, and 258, zener diode 252, SENSEFET power transistor 256, comparator 58, and R-S latch 264. One input of OR circuit 242 is connected with the mode set terminal 76. The other input of OR circuit 242 is connected with the output of R-S latch 264. R-S latch 264 is a circuit that latches its output at a logic low level upon receiving a low going transistion at its reset input while its set input is at logic low. R-S latch 264 also latches its output at a logic high level whenever its set input goes to a logic high level. The output of OR circuit 242 is the "mode" signal and is connected with one input of NOR circuit 142, the input of inverter 148, and one input of NOR circuit 204. It is also connected with the gate electrode of switching transistor 246 which is preferably an N-channel mosfet switching transistor. The drain electrode of switching transistor 246 is connected through resistor 248 with the gate electrode of power SENSEFET transistor 256. An informative discussion on SENSEFET transistors is provided by chapter 9 of the second edition of POWER MOSFET TRANSISTOR DATA referred to hereinabove. The gate electrode of power SENSEFET transistor 256 is also connected through zener diode 252 with its own source electrode and through resistor 254 to the source 43 of direct current at a voltage greater than the voltage supplied by alternator 10. The drain electrode of SENSEFET 256 is connected with the alternator terminal 72. The source electrode of SENSEFET 256 is also connected with one terminal of the window heater element 46. The Kelvin terminal of SENSEFET 256 is connected with the noninverting input of comparator 58. The Kelvin terminal of SENSEFET 256 is a terminal that is connected directly to the source pad of the SENSEFET chip so that the voltage at the source pad can be determined before the losses incurred in the connection from the source pad on the chip to the external source terminal. The sense terminal of SENSEFET 256 is connected with one terminal of resistor 258 and to the inverting input of comparator 58. The other terminal of resistor 256 and the other terminal of the window heater element 46 are connected with ground. The output of comparator 58 is connected with one input of OR circuit 262. The other input of OR circuit 262 is connected with the output of comparator 56. The output of OR circuit 262 is connected with the set input of R-S latch 264. The reset input of R-S latch 264 is connected with the mode set terminal 76.

A source 43 of direct current at a voltage greater than the voltage at alternator terminal 72 is provided by the circuit comprising capacitor 272, diodes 274 and 276, and filter capacitor 278. One terminal of capacitor 272 is connected with the "E" terminal of integrated circuit chip 35 which provides a signal for rectification. In practice it may be desirable to amplify the signal to be rectified by including an amplifier (not shown—one section of a DS0026 inverter would be suitable) between the "E" terminal of integrated circuit chip 35 and capacitor 272. The other terminal of capacitor 272 is connected with the cathode of diode 274 and the anode of diode 276. The anode of diode 274 and one terminal of capacitor 278 are connected with the alternator terminal 72. The other terminal of capacitor 278 and the cathode of diode 276 are connected together and the components requiring connection to a voltage greater than the voltage supplied by alternator 10 are connected with this junction. These components are resistor 206 in the circuit of FIG. 3 and constant current source 306 in the circuit of FIG. 4 and resistor 254 in the circuits of both Figures.

The operation of the regulator circuit shown in FIGS. 3 an 4 is as follows. In the startup condition with the engine running below idle speed, assuming the mode signal received from OR circuit 242 is at logic high indicating the window is not being heated then the output of NOR circuit 204 is at logic low. Assuming, further, that the voltage across low voltage load circuit 22 is less than the desired voltage so the output of comparator 56 is at logic low then the output of OR circuit 202 is at logic low or ground potential. The gate electrodes of switching transistors 212 and 214 are maintained at approximately the voltage of the load circuit 22 by current received through current sensor 44, inductor 26, and zener diode 226. The gate electrode of switching transistor 218 is maintained at logic low by OR circuit 202. Therefore switching transistor 218 is not conducting and the current supplied through resistor 206 in the circuit of FIG. 3 or through constant current source 306 in the circuit of FIG. 4 from source 43 of voltage greater than the voltage at alternator terminal 72 first raises the voltage of the source electrode of switching transistor 212 until it conducts and then supplies current through switching transistor 212 to the gate electrode of main switching transistor 24 and turns it on. The operation of the source 43 of voltage greater than the voltage at alternator terminal 72 will be described subsequently.

Assuming the mode signal received from OR circuit 242 is at logic high indicating the window is not being heated, the alternator field control circuit 38 will be applying maximum current to the alternator field because the voltage across low voltage load circuit 22 is less than the desired voltage. As the alternator speed increases the field will be controlled to maintain the desired battery circuit voltage. The operation of the alternator field control circuit 38 will be described subsequently. If the alternator voltage increases suddenly, which might happen if the battery connection suddenly opened, the battery overvoltage management circuit 40 will operate to maintain the battery circuit voltage at a safe level. The operation of the battery overvoltage management circuit 40 will be described subsequently.

When switch 77 is closed and the mode set signal switches to a low level and if the output of comparator 56 is at logic low then the R-S latch 264 is reset and the mode signal from OR circuit 242 switches to logic low and the alternator voltage is raised to a higher level by alternator field control circuit 38 and power is provided to the heating element of the window by the window control and resistance sensing circuit 34. This circuit controls power to the windshield heating element. It also monitors the resistance of the window heating element and turns the element off if its resistance is outside a predetermined limit. The operation of window control and resistance sensing circuit 34 will be described subsequently. While operating in the high voltage mode, power is provided to the low voltage load circuit 22 and battery 12 by the DC to DC converter comprising main switching transistor 24, inductor 26, and diode 28. Switch driving circuit 42 or 42' provides drive to the gate electrode of the main switching transistor 24 in accordance with commands from pulse width modulating circuit 36. The operation of the DC to DC converter, the switch driving circuits 42 and 42', and pulse width modulating circuit 36 will be described subsequently.

While operating in the high voltage mode a sudden change in the load may cause the alternator output voltage to rise excessively. Should this happen, a transient absorbing semiconductor 164, optionally assisted by transient absorbers 178 and 180, in conjunction with alternator overvoltage management circuit 32 limits the voltage to a safe level. Operation of overvoltage management circuit 32 will be described subsequently. While operating in the high voltage mode it is also possible for the battery voltage to change suddenly because of a sudden opening of the connection to the battery. Should this happen, battery overvoltage management circuit 40 will limit the voltage to a safe level.

The operation of the alternator field current control circuit 38 will now be described. Initially, before the engine attains idle speed, the junction between resistors 136 and 138 will be at less than five volts. This signal is applied to the noninverting input of comparator 54. The five volt reference voltage is applied to the inverting input. Under these conditions, the output of the comparator is at logic low. The logic high mode signal from OR circuit 242 (assuming the windshield is not being heated) is inverted by inverter 148. The logic low signals from comparator 54 and inverter 148 are applied to NOR circuit 144. Since the battery circuit voltage is not excessive the output of comparator 56 is low, therefore all inputs to NOR circuit 144 are low and its output is high. This will cause the output of NOR circuit 146 to be at logic low. The logic low output of NOR circuit 146 is supplied to the gate electrode of switching transistor 152 causing it to be in its conducting state and supply approximately battery voltage to the rotor 154 of alternator 10. Note that the system does not respond at this time to voltage changes at the inputs of comparator 52 because the output of NOR circuit 142 is kept at logic low by the mode signal. Also, the system does not respond to output of the pulse width modulating circuit 36 because the output of NOR circuit 204 is also kept at logic low by the mode signal. As the engine speed increases and the battery circuit voltage rises, the voltage at the junction between resistors 136 and 138 will reach the reference voltage thereby causing the output of comparator 54 to switch to logic high. When the output of comparator 54 switches to logic high the output of NOR circuit 144 switches to logic low and the output of NOR circuit 146 switches to logic high. The logic high output of NOR circuit 146 is supplied to the gate electrode of switching transistor 152 and turns it off. The inductance of the rotor 154 acts to maintain the rotor current. Assuming the alternator overvoltage management circuit 32 is not sensing an overvoltage, the rotor current flows from ground through switching transistor 162 and freewheeling diode 156 to the rotor 154. This current continuously decreases as long as switching transistor 152 remains off. As the rotor current decreases, the battery circuit voltage decreases until comparator 54 switches to the low output state. This process repeats to maintain the battery circuit at the predetermined voltage determined by resistors 136 and 138. If the alternator is unable to develop sufficient voltage for the junction between resistors 136 and 138 to reach the reference voltage then the maximum obtainable voltage will be achieved when the rotor current reaches its maximum and this condition will continue while the mode signal remains low and the alternator is unable to develop sufficient voltage for the voltage at the junction of resistors 136 and 138 to reach the reference voltage.

When the mode signal from OR circuit 242 is at logic low alternator field control circuit 38 operates similarly but regulates the alternator output to a higher voltage under the control of comparator 52 rather than comparator 54. Resistors 122, 124, 126, and 128 form a voltage divider between the alternator terminal 72 and ground. The voltage at the junction of resistors 126 and 128 is applied to the noninverting input of comparator 52. The five volt reference voltage is applied to the inverting input. Assuming switch 77 has just been closed and the mode signal has just switched from high to low, the voltage at the junction of resistors 126 and 128 is much less than five volts and the output of comparator 52 is at logic low. The logic low signal from comparator 52 and the mode signal are applied to NOR circuit 142. Assuming the battery circuit voltage is not excessive the output of comparator 56 is low, therefore all inputs to NOR circuit 142 are low and its output high. This causes the output of NOR circuit 146 to be at logic low. The logic low output of NOR circuit 146 causes the rotor current to increase in the manner previously described with respect to a logic high output from NOR circuit 144. Note that the system does not respond at this time to voltage changes at the inputs of comparator 54 because the output of NOR circuit 144 is kept at logic low by the inverted mode signal. As the rotor current increases the alternator output voltage rises and, assuming sufficient rotor rotational speed, the voltage at the junction between resistors 126 and 128 eventually reaches the reference voltage thereby causing the output of comparator 52 to switch to logic high. When the output of comparator 52 switches to logic high the output of NOR circuit 142 switches to logic low and the output of NOR circuit 146 switches to logic high. The logic high output of NOR circuit 146 is applied to the gate electrode of switching transistor 152 and turns it off as previously described with respect to a logic low output from NOR circuit 144 and similarly causes the rotor current to continuously decrease as long as switching transistor 152 remains off. This process repeats as previously described to maintain the alternator output at the predetermined voltage determined by resistors 122, 124, 126, and 128. If the rotational speed of the alternator rotor is not sufficient for the junction between resistors 126 and 128 to reach the reference voltage then the maximum obtainable voltage will be achieved when the rotor current reaches its maximum and this condition will continue while the mode signal remains low and the rotational speed remains insufficient for the voltage at the junction of resistors 126 and 128 to reach the reference voltage.

The operation of the battery overvoltage management circuit 40 will now be described. Should an open circuit to the battery or other condition occur that causes excessive battery circuit voltage then battery overvoltage management circuit 40 limits the voltage rise. Excessive battery circuit voltage as used herein is defined to mean a voltage above the range within which the regulator normally maintains the battery circuit voltage. When the battery voltage first rises, before overvoltage management circuit 40 has had time to respond, overvoltage is limited by capacitor 30 if it is included and/or by transient absorber 178 if it is included. One or the other is required to limit overvoltage. During normal operation the voltage at the junction between resistors 182 and 184 is at less than 5 volts and the output of comparator 56 is at logic low. The output of comparator 56 is connected with one input of NOR circuit 142, one input of NOR circuit 144, one input of OR circuit 176, one input of OR circuit 202, and one input of OR circuit 262 as indicated by the "x" symbols. If the voltage across the low voltage load circuit 22 becomes excessive by exceeding a predetermined limit the voltage at the junction of resistors 182 and 184 rises above 5 volts and the output of comparator 56 switches to a logic high signal. This causes the outputs of NOR circuits 142 and 144 to be at logic low and the outputs of OR circuits 176, 202 and 262 to be at logic high. The low outputs of NOR circuits 142 and 144 cause switching transistor 152 to be in its nonconducting state and the current in the alternator rotor to decrease as previously described. The high output of OR circuit 176 causes the alternator rotor current to be rapidly reduced as will be described subsequently in the description of the operation of the alternator overvoltage management circuit 32. The logic high output of OR circuit 202 causes the main switching transistor 24 to be in its off or nonconducting state. It does this by raising the gate voltage supplied to switching transistors 212 and 214 thereby causing switching transistor 214 to conduct thereby causing the gate electrode to source electrode signal supplied to main switching transistor 24 to go a low level as is described hereinafter in the description of the operation of the switch driving circuits 42 and 42'. Simultaneously, the logic high output of OR circuit 202 is applied to the gate electrode of switching transistor 218 which turns it on. In the circuit of FIG. 3 switching transistor 218 draws current through resistor 210. In the circuit of FIG. 4 switching transistor 216 draws current through resistor 310 which causes bipolar transistor 320 to conduct. In both circuits the effect is to turn off the main switching transistor 24. This is required in the event an excessive voltage is applied to the battery circuit. Should this happen, a high voltage could be applied through the current sensor 44 and inductance 26 to the source electrode of switching transistor 214 which would raise its voltage (relative to the gate voltage which remains constant because the output of OR circuit 202 is constant) to a voltage such that switching transistor 214 stops conducting. The high voltage would also be applied through capacitor 224 to the source electrode of switching transistor 212 and cause it to conduct. The turning off of switching transistor 214 and turning on of switching transistor 212 would cause main switching transistor 24 to be turned on because the voltage at the upper terminal of capacitor 224 is supplied through switching transistor 212 to the gate electrode of main switching transistor 24. If the above events occur, in the case of the circuit of FIG. 3 the capacitor 224 is rapidly discharged by current flowing from its upper terminal through switching transistor 212, resistor 210, and switching transistor 218 to ground. When capacitor 224 is sufficiently discharged switching transistor 212 stops conducting and the gate voltage of main switching transistor 24 is brought to ground level by the current through resistor 210 and switching transistor 218 which causes main switching transistor 24 to be turned off. In the case of the circuit of FIG. 4 the capacitor 224 is rapidly discharged by current flowing from its upper terminal through switching transistor 212 and bipolar transistor 320 to its lower terminal. When capacitor 224 is sufficiently discharged switching transistor 212 stops conducting and the gate voltage of main switching transistor 24 is brought to the voltage of its source electrode by current through bipolar transistor 320 which causes main switching transistor 24 to be turned off. In summary, taken together, the actions of switching transistors 212, 214 and 218 turn main switching transistor 24 off and keep it off which protects the systems attached to the battery circuit. The logic high output of OR circuit 262 causes the R-S latch 264 to be reset and the mode signal from OR circuit 242 to go to logic high which turns off power to the heating element 46 of the windshield.

After an overvoltage condition, operation is resumed when the output of comparator 56 switches to logic low. Prior to this time the output of OR circuit 202 has been at logic high to direct the turn off of the main power switch 24, the voltage at the source electrode of switching transistor 214 may have been at the voltage of the load circuit 22 because of the connection through inductor 26 and current sensor 44, the gate electrode of main switching transistor 24 has been at approximately the potential of its source electrode, and capacitor 224 may have been discharged to less than the turnon voltage of switching transistor 212 by current drawn through resistor 210 and switching transistor 218. Startup from this condition is described in the following.

The mode signal from OR circuit 242 is at logic high because R-S latch 264 was set by the output of OR circuit 262 which was high while the output of comparator 56 was at logic high. Therefore, the signal from NOR circuit 204 supplied to OR circuit 202 is at logic low and the output of OR circuit 202 switches to logic low when its other input from the output of comparator 56 switches to logic low when the overvoltage condition ends. The logic low output of OR circuit 202 is supplied to the gate electrode of switching transistor 218 and turns it off which enables the current supplied through resistor 206 in the circuit of FIG. 3 or through constant current source 306 in the circuit of FIG. 4 from source 43 of voltage greater than the voltage at alternator terminal 72 to first raise the voltage of the source electrode of switching transistor 212 until it conducts and then supply current through switching transistor 212 to the gate electrode of main switching transistor 24 which turns it on.

The operation of the window control and resistance sensing circuit 34 will now be described. This circuit connects the windshield heating element 46 with the alternator terminal 72 while the mode signal from OR circuit 242 is at logic low. While the windshield is connected with the alternator the resistance of the heating element is monitored and windshield heating is shut down if resistance greater than a predetermined limit is detected. When such a level is detected, the output of R-S latch 264 is set to logic high to inhibit supplying power to the windshield. When switch 77 is closed and the mode set signal from mode terminal 76 switches to logic low the transition resets the output of R-S latch 264 to logic low and the output of OR circuit 242 becomes low because both of its inputs are low. The low output of OR circuit 242 is supplied to the gate electrode of switching transistor 246 and turns it off. This stops the current from flowing through resistor 248 and allows the current through resistor 254 to raise the gate voltage of SENSEFET transistor 256 and turn it on whereupon SENSEFET 256 connects the heating element 46 of the window with the alternator terminal 72. The value of resistor 258 is determined so that the voltage across it is at least as great as the voltage across the windshield heating element 46 for all acceptable values of its resistance. When the voltage across the windshield heating element 46 exceeds the voltage across resistance 258, indicating excessive element resistance, the output of comparator 58 switches to logic high. This might be caused by a crack in the windshield or a defective connection in the wiring to the windshield. The logic high output of comparator 58 is applied to one input of OR circuit 262 which causes its output to go to logic high. The logic high output of OR circuit 262 is applied to the set input of R-S latch 264 which causes its output to go to logic high. The logic high output of R-S latch 264 is applied to an input of OR circuit 242 which causes its output to go to logic high. The high output of OR circuit 242 is supplied to the gate electrode of switching transistor 246 and causes it to conduct. This draws current through resistor 248 and reduces the voltage of the gate electrode of SENSEFET 256 thereby causing it to stop conducting. Zener diode 252 limits the off voltage of the gate electrode of SENSEFET 256 to a level slightly lower than the voltage of the source electrode and limits the on voltage between the gate electrode and the source electrode to a safe value. The output of R-S latch 264 remains at logic high and SENSEFET 256 remains in its off state until there is another transition of the mode set signal from high to low. If the window heating element resistance is still unacceptably high the shutdown process will also repeat thereby keeping the window in the off state at times when the resistance of its heating element is above the predetermined limit.

The operation of the pulse width modulating circuit 36 will now be described. The voltage at the junction between resistors 106 and 108 is monitored at terminal "+1" of integrated circuit chip 35. As the voltage at the junction between resistors 106 and 108 rises the pulse width changes to reduce the duration of the on cycle of main switching transistor 24 thereby reducing the current supplied to the low voltage load circuit 22 and reducing the voltage across it. Similarly, as the voltage at the junction between resistors 106 and 108 diminishes the pulse width changes to increase the duration of the on cycle of main switching transistor 24 thereby increasing the current supplied to the low voltage load circuit 22 and increasing the voltage across it.

Assume that initially the mode signal from OR circuit 242 is at logic low, the output of the current sensor 44 is at logic low or about zero volts, and the battery voltage is below the desired voltage. The current sensor signal and the voltage at the junction between resistors 106 and 108 are applied respectively to the "+2" and "+1" noninverting inputs of integrated circuit chip 35. Under the assumed conditions the output at the "E" terminal of integrated circuit chip 35 is a string of pulses predominantly at a logic high level. The signal at the "E" terminal is appropriate for causing the main switching transistor 24 to conduct at times when the "E" output terminal is at logic high and to not conduct when the "E" output terminals is at logic low. Therefore, initially, the alternator voltage will be applied to the upper terminal of inductor 26 most of the time and a maximum current will be supplied to the battery 12 and low voltage load circuit 22. As the battery circuit voltage rises the voltage at the junction between resistors 106 and 108 will approach the combined reference and feedback voltage supplied through resistors 112 and 114 to the "−1" terminal of the integrated circuit chip 35 thereby causing the signals from terminal "E" to be a logic high a smaller fraction of the time and at logic low a larger fraction of the time. Similarly, as the battery circuit voltage diminishes the pulse width changes to increase the duration of the on cycle of main switching transistor 24 thereby increasing the current supplied to the low voltage load circuit 22 and increasing the voltage across it as previously described. Therefore pulse width modulating circuit 36 functions to maintain the voltage across low voltage load circuit 22 at approximately a predetermined voltage. At higher temperatures the resistance of resistor 106 increases as a consequence of its positive temperature coefficient and for a given voltage across the low voltage load circuit 22 the voltage at the junction between resistors 106 and 108 is greater. This causes pulse width modulating circuit 36 to reduce the duration of the on cycle of main switching transistor 24 thereby reducing the voltage to which it regulates. The opposite happens at lower temperatures. At lower temperatures the resistance of resistor 106 decreases as a consequence of its positive temperature coefficient and for a given voltage across the low voltage load circuit 22 the voltage at the junction between resistors 106 and 108 is less. This causes pulse width modulating circuit 36 to increase the duration of the on cycle of main switching transistor 24 thereby increasing the voltage to which it regulates. Resistor 114 connects the 5 volt reference voltage with the "−1" input of integrated circuit chip 35. Resistor 112 connects the output of the input amplifiers with the "−1" inputs thereby providing negative feedback and controlling the amplifier gain. The values of resistors 112 and 114 are selected to give a range of battery circuit voltages over which the current supplied by the switching regulator goes from minimum to maximum. Accordingly, the pulse width modulating circuit 36 functions to control the conversion of higher voltage DC power from the alternator to DC power at a voltage suitable for the needs of the battery circuit.

The operation of the switch driving circuits 42 and 42' will now be described. Refer to the contents of "box" 42 of FIG. 3 and "box" 42' of FIG. 4. When the "E" output terminal of the integrated circuit chip 35 switches from logic low to logic high to initiate the turning on of main switching transistor 24 while the mode signal from OR circuit 242 is at logic low, the output of NOR circuit 204 switches from high to low. Assuming the battery circuit voltage is not excessive the output of comparator 56 is low, therefore the output of OR circuit 202 will switch from high to low. The low output of OR circuit 202 is supplied to the gate electrode of switching transistor 218 which turns off.

The logic low output of OR circuit 202 is also applied through level shifting capacitor 222 to the gate electrodes of switching transistors 212 and 214 which initiates a chain of events ending with the turning on of main switching transistor 24. This chain of events is described in the following. Assume that initially the gate voltage of switching transistor 214 is greater than its source voltage by about the voltage across capacitor 224 and that the gate voltage of switching transistor 212 is approximately equal to its source voltage. Initially, therefore, switching transistor 212 is in its off state, switching transistor 214 is in its on state, and main switching transistor 24 is in its off state because switching transistor 214 is connecting its gate electrode to its source electrode. Also assume that the source electrode of switching transistor 214 is approximately at ground potential and diode 232 is charging capacitor 224 to the voltage of the load circuit 22. When the output voltage of OR circuit 202 switches to logic low, level shifting capacitor 222 causes an equal level shift at the gate electrodes of switching transistors 212 and 214 which causes switching transistor 212 to turn on and switching transistor 214 to turn off. Switching transistor 212 applies the voltage across capacitor 224 to the gate electrode of main switching transistor 24 and turns it on. When main switching transistor 24 turns on the voltage at its source electrode rises to the high voltage supplied by the alternator and this voltage is supplied directly to the source electrode of switching transistor 214 and through capacitor 224 (which is functioning at this time as a level shifting capacitor) to the source electrode of switching transistor 212. Further, while the voltage of the source electrode of switching transistor 214 rises zener diode 226 applies that voltage to the gate electrodes of switching transistors 212 and 214. Therefore the voltages of all the electrodes of switching transistors 212 and 214 increase by the same incremental amount as the voltage of the source electrode of main switching transistor 24. After turnon is complete current through zener diode 226 maintains the gate voltage of switching transistors 212 and 214 at the voltage of the source electrode of switching transistor 214 and current through resistor 206 in the circuit of FIG. 3 or through constant current source 306 in the circuit of FIG. 4 maintains the voltage across capacitor 224 thereby maintaining main switching transistor 24 in its on state while the output of OR circuit 202 is at logic low. At this time switching transistor 218 is not conducting so it does not affect the voltage at the gate electrode of main switching transistor 24.

Similarly, when the "E" output terminal of the integrated circuit chip 35 switches from logic high to logic low while the mode signal from OR circuit 242 is at logic low to initiate the turning off of main switching transistor 24, the output of NOR circuit 204 switches from low to high. Assuming the battery circuit voltage is not excessive the output of comparator 56 is low, therefore the output of OR circuit 202 will switch from low to high. The high output of OR circuit 202 is supplied to the gate electrode of switching transistor 218 which turns on.

The high output of OR circuit 202 is also applied through level shifting capacitor 222 to the gate electrodes of switching transistors 212 and 214 which initiates a chain of events ending with the turning off of main switching transistor 24. This chain of events is described in the following. Assume that initially the gate voltage of switching transistor 214 is approximately equal to its source voltage, the gate voltage of switching transistor 212 is less than its source voltage by about the voltage across capacitor 224, and the voltage across capacitor 224 is at least equal to the greater of the turnon voltage of switching transistor 212 and the turnon voltage of main switching transistor 24. Initially, therefore, switching transistor 212 is in its on state, switching transistor 214 is in its off state, and main switching transistor 24 is in its on state because switching transistor 212 is connecting its gate electrode with the upper terminal of capacitor 224. When the output voltage of OR circuit 202 switches to logic high, level shifting capacitor 222 causes an equal level shift at the gate electrodes of switching transistors 212 and 214 which causes switching transistor 212 to turn off and switching transistor 214 to turn on. Switching transistor 214 thereupon connects the gate electrode of main switching transistor 24 to its source electrode and turns it off. When main switching transistor 24 turns off the voltage at its source electrode falls to ground because of the connection with ground provided by free wheeling diode 28 while it is conducting so ground potential is supplied directly to the source electrode of switching transistor 214 and through capacitor 224 (which is functioning at this time as a level shifting capacitor) to the source electrode of switching transistor 212. Further, while the voltages of the source electrodes of switching transistors 212 and 214 fall zener diode 226 limits the gate voltage of switching transistor 214 to a voltage approximating the magnitude of the level shift at the output of OR circuit 202. Therefore the voltages of all the electrodes of switching transistors 212 and 214 decrease by approximately the same incremental amount as the voltage of the source electrode of main switching transistor 24. After turnoff is complete and so long as the output of OR circuit 202 is at logic high and the voltage at the source electrode of main switching transistor 24 is maintained at approximately ground potential by free wheeling diode 28, current through resistor 208 in the case of the circuit of FIG. 3 or through the series combination of resistor 308 and diode 334 in the case of the circuit of FIG. 4 maintains the gate voltage of switching transistors 212 and 214 at a logic high level.

FIG. 4 incorporates the diode 334 and bipolar transistor 316 which are not present in FIG. 3. This difference is advantageous when capacitor 48 has relatively small capacitance. For example, it might be desirable for capacitor 48 to be a multilayer ceramic capacitor which is relatively expensive per microfarad of capacitance by comparison with plastic film capacitors of similar capacity thereby encouraging use of a smaller capacitance value. If the value of capacitor 48 is relative small there will be relatively large fluctuations of the voltage across the alternator terminals 72 and 74 during a cycle of main switching transistor 24. When main switching transistor 24 is conducting this voltage fluctuation will be communicated by main switching transistor 24 from its drain electrode to its source electrode and thence to the source electrode of switching transistor 214 and other points where it appears as a downward ramp of voltage during the on cycle of main power transistor 24. This downward voltage ramp appears to be an upward ramp of the voltage at the gate electrodes of switching transistors 212 and 214 where it tends to turn off switching transistor 212 and turn on switching transistor 214. This upward voltage ramp is prevented by bipolar transistor 316. When the output of OR circuit 202 is at its low level and the source electrode of switching transistor 214 is at a higher voltage a small base current flows through resistor 308 thereby allowing perhaps one hundred times as much current to flow from the gate electrodes of switching transistors 212 and 214 to the source electrode of switching transistor 214 and thereby preventing an upward ramp of the gate voltage. The same function could be accomplished by the resistor 208 of FIG. 3 but the voltage drop across resistor 208 would be much greater than the voltage drop across bipolar transistor 316 and would therefore cause power waste and heat generation. Diode 334 allows resistor 308 of FIG. 4 to perform the same function as resistor 208 of FIG. 3 when the voltage at the output of OR circuit 202 is greater than the voltage at the gate electrodes of switching transistors 212 and 214. When the voltage at the output of OR circuit 202 is greater than the voltage at the gate electrodes of switching transistors 212 and 214 then current flows from the output of OR circuit 202 through resistor 308 and diode 334 to the gate electrodes of switching transistors 212 and 214 thereby maintaining a high gate voltage that maintains switching transistor 214 in its on state and switching transistor 212 in its off state.

It cannot be guaranteed that whenever the output of OR circuit 202 is at logic high then the voltage at the source electrode of main switching transistor 24 will be maintained at approximately ground potential by free wheeling diode 28. One circumstance where this is not the case is operation in a single voltage mode which is described hereinbelow. Another such circumstance is when the current through freewheeling diode 28 drops to zero. When this happens the voltage at the source electrode of main switching transistor 24 rises to the voltage of the low voltage load circuit 22. When this happens at the same time as the output of OR circuit 202 is at logic high switching transistor 214 is switched from its on to its off state and switching transistor 212 is switched from its off state to its on state. This is undesirable because it causes turnon of the main switching transistor 24. Therefore it is necessary to include additional components to insure proper operation under these circumstances. In the circuit of FIG. 3 turnon of the main switching transistor 24 is prevented by switching transistor 218 and resistor 210. When the voltage at the source electrode of main switching transistor 24 rises above ground potential at the same time as switching transistor 218 is in its on state current is conducted from the gate electrode of main switching transistor 24 through resistor 210 and switching transistor 218 to ground at a greater rate than it can be replenished by current from the source 43 of direct current at a voltage greater than the voltage at alternator terminal 72 through resistor 206 thereby reducing the voltage at the gate electrode of the main switching transistor 24 and turning it off. In the circuit of FIG. 4 turnon of the main switching transistor 24 is prevented by switching transistor 218, resistor 310, and bipolar transistor 320. When the voltage at the source electrode of main switching transistor 24 rises above ground potential at the same time as switching transistor 218 is in its on state base current is conducted from the gate electrode of main switching transistor 24 through the base and emitter electrodes of bipolar transistor 320, resistor 310, and switching transistor 218 to ground. The base current allows bipolar transistor 320 to conduct perhaps 100 times as much current as its base current from the gate electrode of main switching transistor to its source electrode which draws current from the gate electrode at a greater rate than it can be replenished by current from the source 43 of direct current at a voltage greater than the voltage at alternator terminal 72 through constant current source 306 thereby reducing the voltage at the gate electrode of the main switching transistor 24 and turning it off or maintaining it in its off state.

In addition to the dual voltage mode of operation there is a single voltage mode of operation when the mode signal from OR circuit 242 is at logic high because switch 77 is open and current through resistor 78 raises the level of the mode set signal to logic high. When the mode signal is at logic high the output of NOR circuit 204 is constantly at logic low regardless of the voltage of the signal from the "E" terminal of integrated circuit chip 35 and the output of OR circuit 202 will therefore be at logic low assuming the battery circuit voltage is not excessive and the output of comparator 56 is low. When output of OR circuit 202 is low as described hereinabove main switching transistor 24 is maintained in its on or conducting condition by current supplied through resistor 206 in the circuit of FIG. 3 or through constant current source 306 in the circuit of FIG. 4 from source 43 of voltage greater than the voltage at alternator terminal 72 and through switching transistor 212 to the gate electrode of main switching transistor 24. In this mode of operation the output of alternator 10 is connected constantly through main switching transistor 24, inductor 26, and current sensor 44 with the upper terminal of the battery 12 and load circuit 22. Therefore, in this mode the battery circuit 12 and load circuit 22 are supplied by the alternator in the same manner as they would be supplied in a conventional single voltage vehicular power supply system.

The operation of the DC to DC converter will now be described. When main switching transistor 24 is in its conducting state as commanded by a logic high output from terminal "E" of integrated circuit chip 35, the alternator voltage is applied to the upper terminal of inductor 26. This causes the current supplied to low voltage load circuit 22 and battery 12 through inductor 26 to increase and energy to be stored in the magnetic field of the inductor. Under these circumstances, the current is partially supplied by alternator 10 through terminal 72 and partially supplied by the discharge of capacitor 48 and increases while main switching transistor 24 remains in its on state. When main switching transistor 24 is in its nonconducting state as commanded by a logic low output from terminal "E" of pulse width modulating circuit 36, the current supplied low voltage load circuit 22 and battery 12 through inductor 26 is maintained by inductor 26 by drawing on the energy stored in its magnetic field. Under these circumstances, the current is supplied through diode 28 and it diminishes while main switching transistor 24 remains in its off state. Therefore the DC to DC converter operates to use electricity at the voltage of the alternator output to provide electricity at the voltage of the battery 12 and low voltage load circuit 22.

The operation of the alternator overvoltage management circuit 32 will now be described. Operation of the alternator overvoltage management circuit 32 can be initiated under two different circumstances. When the mode signal is at logic low and the alternator is being controlled to produce a high output voltage a sudden load change or other condition that causes the alternator output voltage to be excessive will cause comparator 50 to initiate operation of the overvoltage management circuit 32. Operation of the overvoltage management circuit 32 may also be initiated by comparator 56 if an open battery connection or other circumstance causes the voltage of load circuit 22 to become excessive.

Prior to activation of the alternator overvoltage management circuit 32 by comparator 50 while the mode signal is at logic low the output of comparator 52 will have switched to high and caused the output of NOR circuit 142 to be at logic low. The output of NOR circuit 144 will also be at logic low because the inverted mode signal is high. Therefore, as previously described with respect to operation of the alternator field current control circuit 38, the output of NOR circuit 146 is at logic high and switching transistor 152 is in its nonconducting state.

Upon activation of the alternator overvoltage management circuit 32 by comparator 56 the high output of comparator 56 will cause the outputs of NOR circuits 142 and 144 to switch to logic low if they were not already at logic low. Thereupon the output of NOR circuit 146 switches to logic high and switching transistor 152 switches to its nonconducting state as previously described with respect to the battery overvoltage management circuit 40.

Should a sudden load change or other condition occur that causes the alternator output voltage to be excessive then transient absorber 164 will limit the voltage rise. To minimize the power absorbed by the transient absorber 164 the alternator field current is rapidly reduced. Should an open battery connection or other condition occur that causes the load circuit voltage to be excessive then transient absorber 178 or capacitor 30 will limit the voltage rise. To minimize the power absorbed by the transient absorber 178 or capacitor 30 main power switch 24 is turned off and the alternator field current is rapidly reduced.

When activation of the alternator overvoltage management circuit 32 is initiated by comparator 50 the voltage at the junction between resistors 132 and 134 rises above the reference voltage and the output of comparator 50 switches to logic high. This causes the output of OR circuit 176 to switch to logic high. When activation of the alternator overvoltage management circuit 32 is initiated by comparator 56 the voltage at the junction between resistors 182 and 184 rises above the reference voltage and the output of comparator 56 switches to logic high. This causes the output of OR circuit 176 to switch to logic high. It also causes switching transistors 152 and main power switch 24 to be turned off as described hereinabove with respect to the operation of the battery over-voltage management circuit 40.

In either case, whether comparator 50 or comparator 56 initiates activation of the alternator overvoltage management circuit 32, the high output of OR circuit 176 is applied through resistor 174 to the gate electrode of switching transistor 168 and causes switching transistor 168 to conduct. During normal operation the gate electrode of switching transistor 162 is kept at the battery circuit voltage by current supplied through resistor 166 which keeps switching transistor 162 in its conducting state. When switching transistor 168 conducts, the gate voltage of switching transistor 162 is reduced to its source electrode voltage and it switches from its conducting to its nonconducting state. When switching transistor 162 is in its nonconducting state and noting that switching transistor 152 is also in its nonconducting state the current entering rotor 154 must overcome the voltage drop in transient absorber 158. This voltage can be made arbitrarily large and therefore arbitrarily quickly absorb the inductive energy of the rotor 154. The dumping of energy from the rotor 154 into transient absorber 158 reduces the time for the alternator voltage to drop to a safe level and minimizes the alternator output power that must be dissipated in transient absorber 164. Switching transistor 168 remains in its conducting state and keeps switching transistor 162 in its nonconducting state as long as the voltage at their source electrodes remains well below zero volts. This condition will persist until the current through transient absorber 158 drops to zero which will happen either when the current through the alternator rotor diminishes to zero or, the normal case, the switching transistor 152 is turned on so it supplies the rotor current.

If desired, transient absorbers 178 and 180 may be provided in addition to transient absorber 164. In the event of excessive alternator voltage, in addition to passage of current through transient absorber 164, current passes through transient absorber 180, inductor 26, and transient absorber 178. This limits alternator voltage by dumping current into the battery voltage circuit and utilizes transient absorber 178 to insure that the excess current is bypassed. In the case when transient absorber 180 is provided as part of the main switching transistor 24 there is the advantage that much less power is dissipated in the transient absorber 164 which can be a smaller and less expensive device and much of the power is dissipated in the main switching transistor 24 which has substantial power dissipating capacity.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a vehicle electrical system of the type including a DC generator, a storage battery having a rated voltage, a first load circuit including said storage battery and one or more load devices designed to be powered by electricity at a voltage in a first voltage range corresponding to the rated voltage of the battery, and a second load circuit including one or more load devices designed to be powered by electricity at a voltage in a second voltage range substantially higher than the rated voltage of said battery, a first regulator comprising a first switch having a control element and having an input coupled with an output of said DC generator and having an output coupled with said first load circuit, the improvement comprising:

means for providing a mode signal, and control means responsive to said mode signal for controlling said first regulator to operate in a first mode, for converting DC power from said DC generator at a voltage in said second voltage range to DC power at a voltage in said first voltage range and to supply said converted power to said first load circuit, or in a second mode for maintaining a constant direct connection between said alternator and said first load circuit.

2. The invention as defined by claim 1 wherein:
said direct connection is achieved by controlling said first switch to close and remain closed during operation in said second mode.

3. A circuit for driving a power transistor, in accordance with a control signal, said power transistor having a control electrode and first and second power electrodes, said circuit comprising an inverter, said inverter having an input terminal, an output terminal, and first and second power supply terminals, said circuit also comprising a first capacitor, a second capacitor, and a diode, said output terminal of said inverter being connected with said control electrode, said second power supply terminal of said inverter being connected with said second power electrode, said first capacitor being connected between said first and second power supply terminals of said inverter, said diode having a first terminal connected with a first source of voltage and having a second terminal connected with said first power supply terminal of said inverter, and said second capacitor having a first terminal connected with said control signal and a second terminal connected with said input terminal of said inverter.

4. The invention as defined by claim 3 including a current conduction means connected in parallel with said second capacitor.

5. The invention as defined by claim 4 wherein said current conduction means is a resistor.

6. The invention as defined by claim 4 wherein said current conduction means is also connected with said second power supply terminal of said inverter for conducting current between said input terminal of said inverter and said second power supply terminal of said inverter when the voltage at said first terminal of said second capacitor is less than the voltage at said input terminal of said inverter.

7. The invention as defined by claim 3 including,
a zener diode having a first terminal connected with said second power supply terminal of said inverter and a second terminal connected with said input terminal of said inverter.

8. The invention as defined by claim 3 including,
a second source of voltage, and
a current conduction means connected between said second source of voltage and said first power supply terminal of said inverter.

9. The invention as defined by claim 8 wherein said current conduction means comprises a resistor.

10. The invention as defined by claim 8 wherein said current conduction means conducts current at a rate that is substantially independent of the voltage across said current conductio means.

11. The invention as defined by claim 3 wherein,
said inverter comprises an N-channel power transistor and a P-channel power transistor each having gate, drain, and source electrodes,
said gate electrode of said N-channel power transistor and said gate electrode of said P-channel power transistor are connected together and are connected with said input terminal of said inverter,
said drain electrode of said N-channel power transistor and said drain electrode of said P-channel power transistor are connected together and are connected with said output terminal of said inverter,
said source electrode of said N-channel power transistor is connected with one of said power supply terminals of said inverter, and
said source electrode of said P-channel power transistor is connected with the other one of said poer supply terminals of said inverter.

12. In a vehicle electrical system of the type including a DC generator for producing an output voltage,
said DC generator having a magnetic flux generating means energized by DC current,
a freewheeling diode connected in series with said flux generating means for conducting said DC current at certain times, the improvement comprising:
voltage sensing means for sensing when the output voltage of said generator is excessive and generating an overvoltage signal indicating excessive output voltage,
means responsive to said overvoltage signal by impeding the flow of current through the series combination of said freewheeling diode and said flux generating means.

13. The invention as defined by claim 12 wherein,
said means responsive to said overvoltage signal comprises a parallel combination of a switching means and a current flow impeding means,
said switching means being responsive to said overvoltage signal by turning off.

14. The invention as defined by claim 13 wherein said current flow impeding means comprises a diode.

15. The invention as defined by claim 3 including,
current conduction means responsive to a voltage level between said first terminal and said second terminal of said second capacitor by conducting, and
said current conduction means being connected with said control electrode.

16. The invention as defined by claim 15 wherein,
said current conduction means comprises the series combination of a switching transistor and a resistor connected with said control electrode, and said switching transistor being responsive to said voltage level between said first terminal and said second terminal of said second capacitor by turning on.

17. The invention as defined by claim 15 wherein, said current conduction means comprises a bipolar transistor for conducting current between said control electrode and said second power electrode.

* * * * *